United States Patent
Preston et al.

(10) Patent No.: US 6,754,558 B2
(45) Date of Patent: Jun. 22, 2004

(54) EFFICIENT COLLECTION OF INFORMATION FROM VENDING MACHINES

(75) Inventors: Kevin W. Preston, Masterton (NZ); Gregory P. Bauer, Masterton (NZ); Harley F. O'Neill, Carterton (NZ)

(73) Assignee: Vending Management Services Ltd., Masterton (NZ)

( * ) Notice: Subject to any disclaimer, the term of this patent is extended or adjusted under 35 U.S.C. 154(b) by 122 days.

(21) Appl. No.: 09/941,103

(22) Filed: Aug. 28, 2001

(65) Prior Publication Data

US 2003/0050841 A1 Mar. 13, 2003

(51) Int. Cl.$^7$ .................................................. G06F 7/00
(52) U.S. Cl. ........................ 700/236; 700/241; 700/244
(58) Field of Search ................................. 700/231, 236, 700/238, 241, 244; 235/385, 381

(56) References Cited

U.S. PATENT DOCUMENTS

| | | | |
|---|---|---|---|
| 1,835,595 A | 7/1928 | Freidrichs | 194/217 |
| 3,095,997 A | 7/1963 | Garvin | 221/180 |
| 3,175,669 A | 3/1965 | Garvin | 194/2 |
| 3,513,962 A | 5/1970 | Stone et al. | 198/57 |
| 3,749,280 A | 7/1973 | Gale | 221/67 |
| 4,398,651 A | 8/1983 | Kumpfer | 221/6 |

(List continued on next page.)

FOREIGN PATENT DOCUMENTS

| | | |
|---|---|---|
| DE | 2912510 | 10/1979 |
| JP | 1-175695 | 7/1989 |
| NL | 8600003 | 1/1986 |

OTHER PUBLICATIONS

Meet the Smart Coke Machine; The Sacramento Bee Business Technology; Wednesday, Aug. 30, 1995.
Skywire Provides Details of Wireless "VendView" System; Vending Times, Sep., 1994.
Skywire Allows Vendor Tracking of Pop Stock and Sales Details; RCR, vol. 14, No. 17, Sep. 4, 1995.
Left high and dry? Sold–out machine sends for Cokes; Nashville Banner, Wednesday, Aug. 15, 1995.
Coke machines signal when it's time for a refill; the Globe & Mail, Toronto, ON, Aug. 30, 1995.
Wireless Communications Forum; vol. III, No. 1, Apr. 1995.

*Primary Examiner*—Khoi H. Tran
(74) *Attorney, Agent, or Firm*—Withrow & Terranova PLLC

(57) ABSTRACT

The present invention provides an efficient system for providing vending information from vending machines to a central processing system. Difference indicia representing changes in vending information from a previous update is sent to the central processing system from a vending machine. The difference indicia provides sufficient information for the central processing system to update the data kept at the central processing system to reflect new vending information. Preferably, reference vending data is kept at the vending machine and at the central processing system. New vending data is compared with the reference vending data to identify differences between the new vending data and the reference vending data. These differences are used to generate the difference indicia sent to the central processing system. Upon receipt by the central processing system, the difference indicia is used to modify the reference vending data stored at the central processing system to reflect the new vending data.

12 Claims, 10 Drawing Sheets

U.S. PATENT DOCUMENTS

| | | | |
|---|---|---|---|
| 4,412,292 A | 10/1983 | Sedam et al. | 364/479.11 |
| 4,629,090 A | 12/1986 | Harris | 221/7 |
| 4,639,875 A | 1/1987 | Abraham | 364/479 |
| 4,706,794 A | 11/1987 | Awane | 194/217 |
| 4,766,548 A | 8/1988 | Cedrone et al. | 364/479.06 |
| 4,876,532 A | 10/1989 | Sauls | 221/3 |
| 5,029,098 A | 7/1991 | Levasseur | 364/479.14 |
| 5,091,713 A | 2/1992 | Horne et al. | 364/479.11 |
| 5,097,981 A | 3/1992 | Degaspeni et al. | 221/3 |
| 5,207,784 A | 5/1993 | Schwartzendruber | 221/6 |
| 5,282,127 A | 1/1994 | Mii | 364/479.11 |
| 5,442,344 A * | 8/1995 | Merkle et al. | 705/22 |
| 5,608,643 A | 3/1997 | Wichter et al. | 364/479.14 |
| 5,844,808 A * | 12/1998 | Konsmo et al. | 700/244 |
| 5,963,452 A * | 10/1999 | Etoh et al. | 700/236 |
| 6,012,834 A * | 1/2000 | Dueck et al. | 700/238 |
| 6,181,981 B1 | 1/2001 | Varga et al. | 700/236 |
| 6,272,395 B1 * | 8/2001 | Brodbeck | 700/236 |
| 6,330,490 B1 * | 12/2001 | Kim et al. | 700/234 |
| 6,339,731 B1 * | 1/2002 | Morris et al. | 700/236 |
| 6,397,193 B1 * | 5/2002 | Walker et al. | 705/16 |
| 6,505,095 B1 * | 1/2003 | Kolls | 700/244 |
| 2001/0042121 A1 | 11/2001 | Defosse et al. | 709/224 |
| 2001/0047410 A1 | 11/2001 | Defosse | 709/224 |
| 2001/0054083 A1 | 12/2001 | Defosse | 709/217 |
| 2002/0016829 A1 | 2/2002 | Defosse | 709/217 |
| 2002/0194387 A1 | 12/2002 | Defosse | 709/251 |
| 2003/0009313 A1 | 1/2003 | May et al. | 702/188 |
| 2003/0097474 A1 | 5/2003 | Defosse et al. | 709/246 |

* cited by examiner

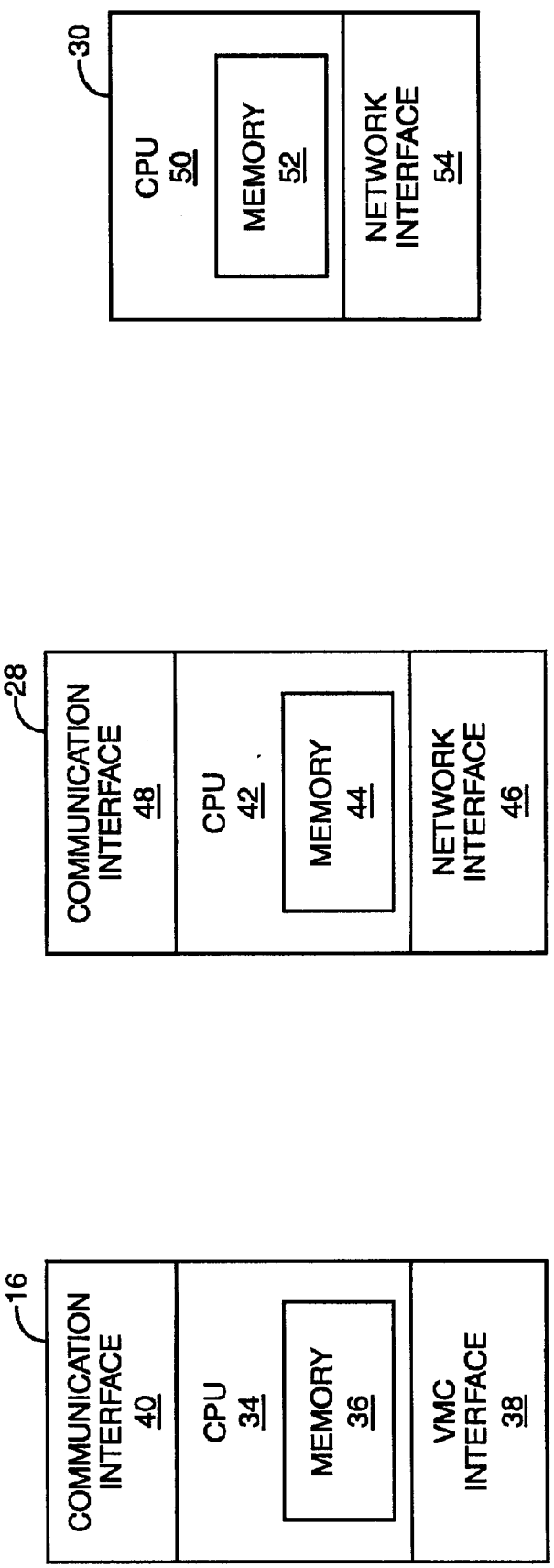

he present invention provides an efficient system for
EFFICIENT COLLECTION OF INFORMATION FROM VENDING MACHINES

FIELD OF THE INVENTION

The present invention generally relates to collecting information from vending machines in the vending industry, and in particular relates to efficiently collecting such information on an ongoing basis.

BACKGROUND OF THE INVENTION

In an attempt to more efficiently service and stock vending machines, vending machines have been equipped with communication electronics to provide information to a central location for processing. Communicating vending information to and from vending machines is generally referred to as "online vending." For online vending, the information collected from a vending machine is transmitted across large distances to a central server computer by telephone line, radio signal, or the like, where it is used for management purposes. The costs associated with such data transmission have a major impact on the profitability of the vending operation, since the data is normally sent on a daily basis. If the amount of data to be transmitted can be significantly reduced, the cost of data transmission is correspondingly reduced, and the viability of the vending operation is enhanced. Electronically controlled vending machines provide a large quantity of sales and fault related data, and the challenge has been to reduce the data transmitted without compromising the quality or quantity of data available at the central server computer.

Previous attempts have included selective sending of the data. For example, information is sent to the central server computer only on selected days of the week, or only certain types of information are sent. The disadvantages of these methods are that while data volume and hence costs are reduced, the available data at the central server computer is also reduced. For example, if a vending data collection unit is set up to call only on week nights, the machine may run low on stock during a weekend, and the machine will not be serviced because it does not call in over the weekend. There is also a reduced amount of data available for the technical maintenance of both the vending machines, and the data reporting system. Furthermore, if the unit only reports sales information, then when a vending machine fault occurs, it will not be communicated, and the vending machine may be left in a condition where it is unable to sell for some period of time before a dissatisfied customer reports the machine malfunction.

In a system that only reports certain types of vending machine data, there is often manual overhead involved with managing which types of data are to be returned and which are not as the vendor operators extend their ideas as to what data is now essential. Many systems require periodic changes in memory, such as a read only memory (ROM). These changes often require the memory to be physically replaced with one reprogrammed with a new set of software in order to make changes in the types of data reported, and this is a costly and time consuming operation in the light of the large number of vending machines that exist.

As such, there is a need to provide a vending machine or related interface that overcomes the above disadvantages while significantly reducing the quantity of data transmitted.

SUMMARY OF THE INVENTION

The present invention provides an efficient system for providing vending information from vending machines to a central processing system. Difference indicia representing changes in vending information from a previous update is sent to the central processing system from a vending machine. The difference indicia provides sufficient information for the central processing system to update the data kept at the central processing system to reflect new vending information. Preferably, reference vending data is kept at the vending machine and at the central processing system. New vending data is compared with the reference vending data to identify differences between the new vending data and the reference vending data. These differences are used to generate the difference indicia sent to the central processing system. Upon receipt by the central processing system, the difference indicia is used to modify the reference vending data stored at the central processing system to reflect the new vending data.

Preferably, the reference vending data and the new vending data at the vending machine are compared on a line-by-line basis. Each line will represent a record having a record type and associated data for the record type. Based on the comparison between the new vending data and the reference vending data, insert, delete, and replace commands are generated to form the difference indicia. An insert command will insert the corresponding line to reflect new vending data in the reference vending data at the central processing system. A delete command will cause a corresponding line to be deleted from the reference vending data at the central processing system when the new vending data no longer has a corresponding line or record. The replace command is preferably used when lines in the new and reference vending data have a similar record type, but different data associated therewith can also be used as a simultaneous delete and insert. As such, the replace command may provide information to change the data associated with a given record in the reference vending data at the central processing system.

The present invention may be implemented in a vending machine control system or in a vending machine user interface associated with a vending machine controller in a vending machine. Either the vending machine controller or the vending machine user interface is preferably associated with communication electronics to communicate the difference indicia via direct or wireless communications to the central processing system, over any number of networks. The concepts of the present invention may be implemented in the hardware of the vending machine, vending machine controller, or vending machine user interface as well as in software, process, or method. The software of the present invention may be implemented in various types of computer readable media, including, but not limited to programmable memory devices, magnetic disk, optical disk, and the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

FIG. 3 is a block representation of a vending machine interface unit constructed according to the present invention.

FIG. 4 is a block representation of a host computer constructed according to the present invention.

FIG. 5 is a block representation of a central server computer constructed according to the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
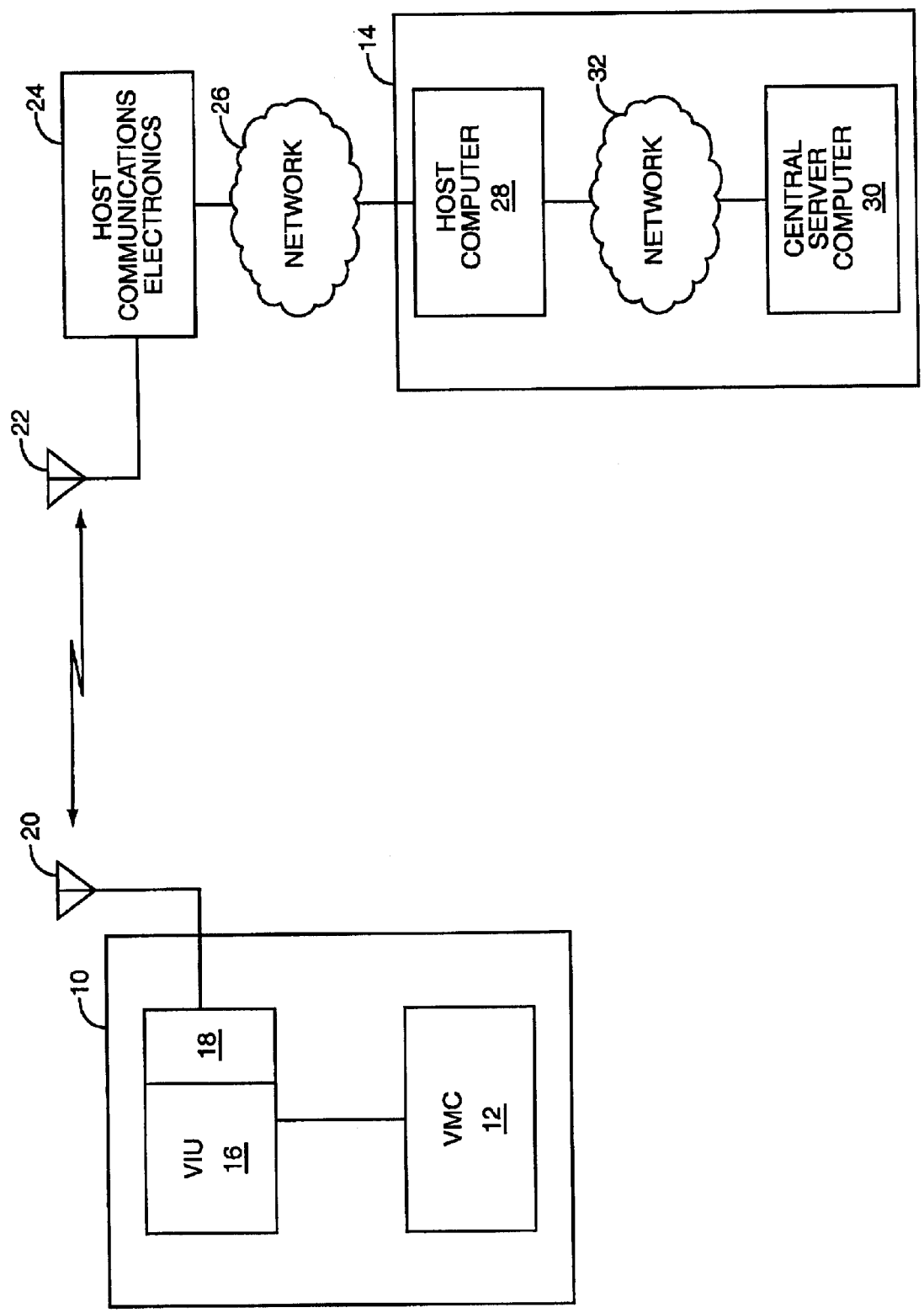
FIG. 1 is an overall system view of a vending environment incorporating wireless communications.

FIG. 1 illustrates a vending machine 10 associated with a vending machine controller 12 (VMC) or other source of data, which is to be communicated to a central processing system 14. The VMC 12 is also associated with a vendor interface unit (VIU) 16 containing sufficient processing ability to receive and reduce data to send to the central processing system 14 as described in detail below. The VIU 16 is connected to communication electronics 18 capable of communicating data to the central processing system 14 using wireless or direct communications. FIG. 1 illustrates a wireless communication configuration, wherein the communication electronics 18 includes the requisite transmitter and optional receiver in communication with antenna 20 to transmit data to (and optionally receive data from) host communication electronics 24 via antenna 22. The host communication electronics 24 will preferably communicate received data to the central processing system 14 directly or via network 26. Wireless communications will generally involve radio frequency or light signals, and the communications electronics 18 is preferably a wireless modem. For light-based transmission the antennas 20 and 22 will typically be an optical transmitter and receiver, respectively. In a direct communication environment, as illustrated in FIG. 2, the communication electronics 18 associated with the VIU 16 will preferably communicate with the central processing system 14 directly or via network 26.

In wireless or direct communication environments, networks, such as network 26, may be used to extend the distance between the vending machine 10 and the central processing system 14 so that they may be in different parts of a country, or internationally separated using packet-or circuit-switched networks, such as the Internet or the public switched telephone network (PSTN), respectively.

Figure 2:
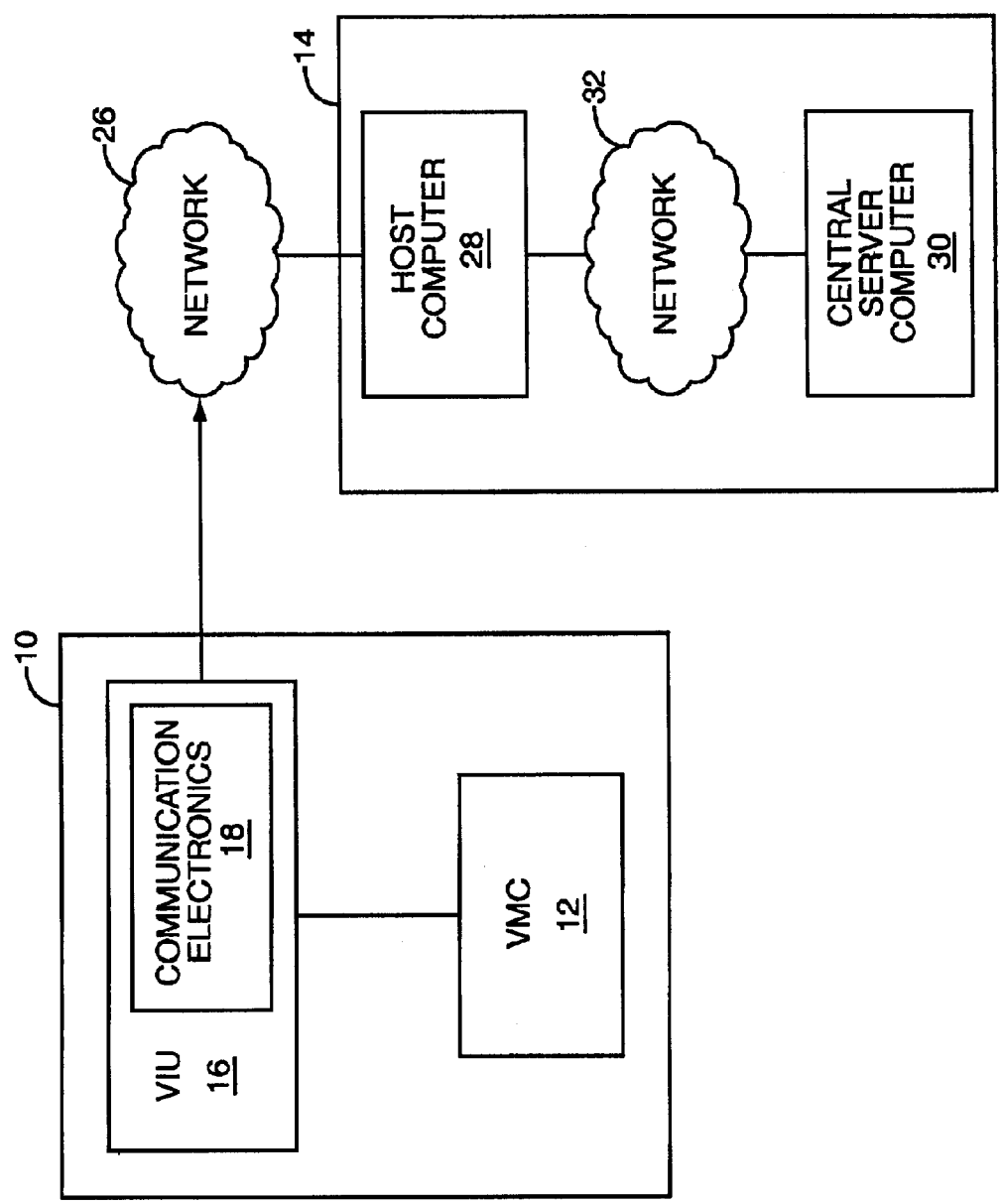
FIG. 2 is an overall system view of a vending environment incorporating direct communications.

In FIGS. 1 and 2, the preferred embodiment of the central processing system 14 includes a host computer 28 whose primary function is as a communications controller capable of processing data received from the vending machine 10 or its VIU 16. The central processing system 14 also includes a central server computer 30, which preferably functions as a database server holding the data gathered from vending machines, including vending machine 10. The host computer 28 and central server computer 30 communicate with one another over a local or wide area network 32. Notably, the functionality of the host computer 28 and central server computer 30 may be incorporated into a single computer. Further, the host computer 28 and central server computer 30 may be located remotely from one another to varying degrees.

Before describing the preferred operation of the present invention, the basic architecture of the VIU 16, host computer 28, and central server computer 30 are described in association with FIGS. 3, 4, and 5 respectively. As shown in FIG. 3, the VIU 16 will include a central processing unit (CPU) 34 having memory 36 and a VMC interface 38 for supporting interaction with the VMC 12 of the vending machine 10. The memory 36 will preferably include software and data necessary for operation as described below. The CPU 34 will also include a communication interface 40 to facilitate communications via communication electronics 18. Alternatively, the communication interface 40 may include the communication electronics 18.

FIG. 4 depicts a block representation of the host computer 28. The host computer 28 will preferably take the form of a general-purpose computer or workstation, and will include a CPU 42 having memory 44 and a communication interface 48 for supporting interaction with the VIU 16 of the vending machine 10, directly or indirectly through network 26. The memory 44 will preferably include software and data necessary for operation as described below. The CPU 42 may also include a network interface 46 to facilitate communications with the central server computer 30 via network 32. Alternatively, the communication interface 48 and network interface 46 may be integrated to support communications over networks 26 and 32.

FIG. 5 depicts a block representation of the central server computer 30. The central server computer 30 will preferably take the form of a traditional server or like network computer, and will include a CPU 50 having memory 52 and a network interface 54 for supporting interaction with host computer 28 via network 32. The memory 52 will preferably include software and data necessary for operation.

Figure 6:
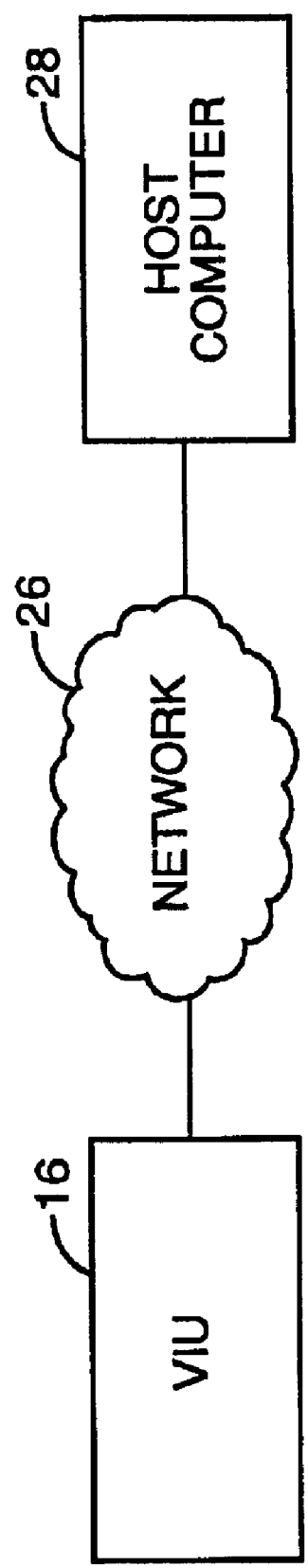
FIG. 6 is a simplified functional view of systems depicted in FIGS. 1 and 2.

The primary manner of operation of the preferred embodiment of the present invention is functionally summarized in FIG. 6. As depicted, the VIU 16 is connected via network 26 to the host computer 28. The VIU 16 is configured to implement a reducing algorithm, preferably for relative differencing reduction, and the host computer 28 is configured to implement a corresponding reconstruction algorithm on information reduced by the reducing algorithm. In practice, the number and type of communications between the host VIU 16 and host computer 28 is immaterial to the functional operation of the invention.

In one preferred implementation, the VIU 16 calls the host computer 28 daily, and vending machine data is transmitted from the VIU 16 to the host computer 28. This represents one file of daily data per day. On days that the vending machine operator has visited to refill the vending machine 10 with product, a second file of fill-related data is transmitted pertaining to the sales and other information up to the point of refilling the vending machine 10. In another implementation, the host computer 28 contacts the VIU 16 periodically.

Figure 7:
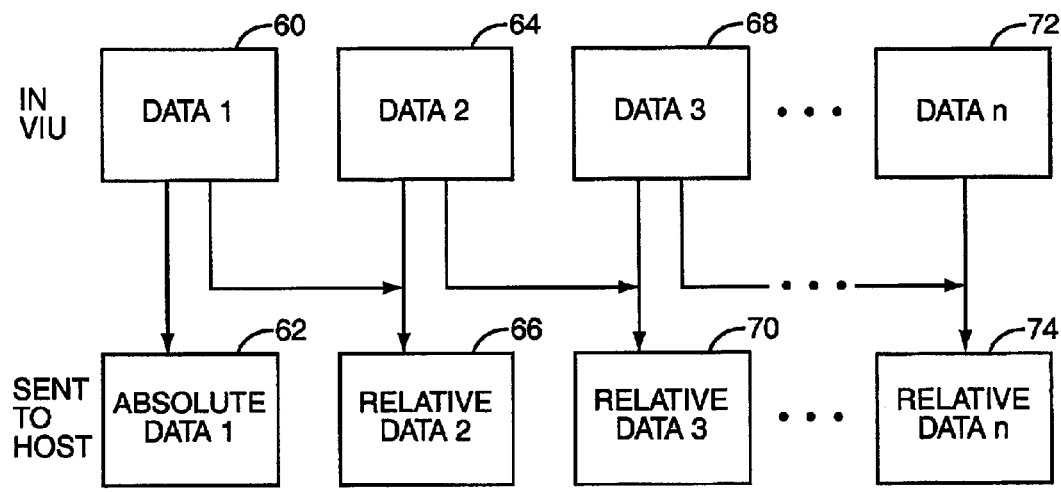
FIG. 7 illustrates the relationship between original files and reduced files.
Figure 8:
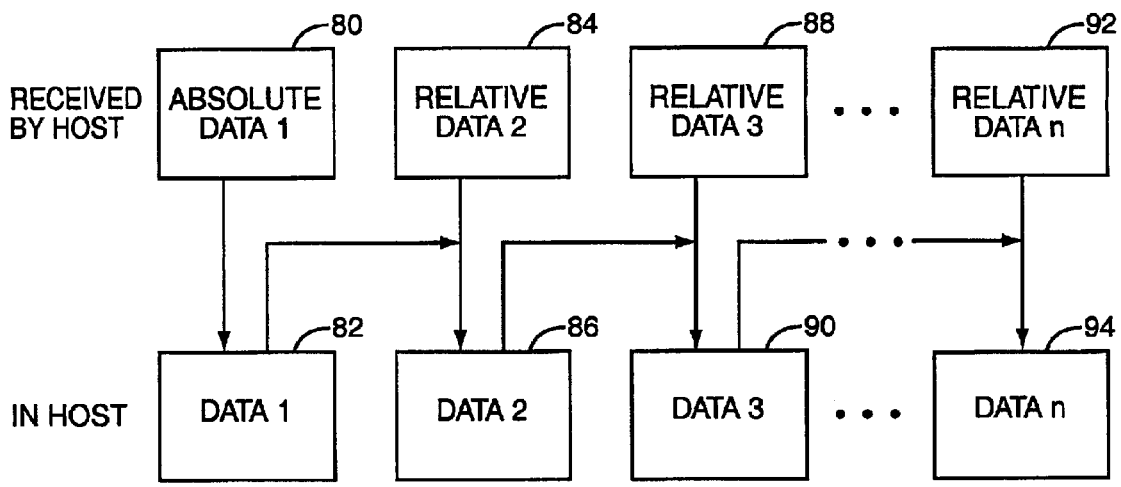
FIG. 8 illustrates the relationship between the reference file, the reduced files and the reconstructed files.

With reference to FIGS. 7 and 8, the basic principles of the invention are illustrated, wherein only such data files from the VIU 16 are sent to the host computer 28 as are necessary to provide a complete and identical copy of the actual data within the VIU 16 to the host computer 28. As a starting point, a complete absolute file copy of the initial Data 1 (block 60, FIG. 7) is sent from the VIU 16 (block 62) and received by the host computer 28 (block 80, FIG. 8) and held as a complete reference copy file (block 82), with the original copy being held in the VIU 16. These files (blocks 60 and 82) form the initial reference data.

The VIU 16 is configured to implement algorithms that include but are not limited to relative differencing algorithms. These algorithms compare new data (block 64) to the existing reference data (block 60) in the VIU 16 and send a relative data file (block 66) sufficient to alter the reference data on the host computer 28 (block 82) in the form of a relative data file (block 84) to form a new file (block 86), which exactly reflects the new data (block 64) held within the VIU 16. Upon confirmation of the correct reconstruction of the new data (block 86) within the host computer 28, this new data is used at the VIU 16 (block 64) and at the host computer 28 (block 86) as the reference for the next data transmission. The new data reconstructed at the host computer 28 is passed on to the central server computer 30 as if it were received in its entirety from the VIU 16. This process is repeated as often as data files are transferred between the VIU 16 and the host computer 28 (blocks 68 to 74) and (blocks 88 to 94).

In the event that it is not possible to correctly reconstruct the data at the host computer 28, the data may be re-sent in absolute form (as compared to relative form), and this resynchronizes the two ends so that relative transmissions of data may resume thereafter. Because this happens only rarely, the overall data traffic over a period of time is not significantly increased. In one preferred form, a small proportion of files are sent in absolute form to maintain the integrity of the reference file at the host computer 28. This is achieved by sending only the daily data in relative form, wherein fill data and data transmitted by service calls is sent in absolute form. This proportion of absolute files is a backstop measure in case the confirmation process mentioned above and described below fails, as is statistically possible.

The success of the process described above normally relies on being able to confirm that the reconstructed file at the host computer 28 is identical to the file at the originating VIU 16. To this end, a data authentication code consisting of a CRC or hash key is generated from the original file at the VIU 16, and is compared to the hash key generated from the reconstructed file at the host computer 28. The hash key is a number that is generated from and is dependent upon the contents of the file. If a difference is detected between the hash keys, it may be assumed that the two files are different, and the situation is remedied by the retransmission of the file in absolute form to obtain the correct information at the host computer 28, and to further resynchronize the two reference files in preparation for the next data file. If no difference is detected between the hash keys, it may be assumed that the file has been reconstructed at the host computer 28 correctly, although there is a small statistical probability that an erroneously reconstructed file at the host computer 28 may generate the same hash key as the original file at the VIU 16 in the event of a noisy communication channel. This possibility exists because the hash key is of limited size. In one preferred form, a 16-bit hash key is generated, giving a 1 part in 65,536 chance that an incorrectly reconstructed file could generate an identical hash key, thus appearing to be correct. To further reduce the probability of undetected errors, the data between the VIU 16 and the host computer 28 is packeted and each packet is protected by a 16-bit cyclic redundancy checksum. This reduces the risk of undetected errors by a further 1 part in 65,536, making an overall possibility of undetected error less than 1 part in 4 billion. This is further reduced if certain types of communication medium are used whereby the data communication carrier performs further checking and resending of lost or corrupted data packets within the communications network. Nevertheless, the possibility of error still remains, and the occasional resynchronization of reference packets at intervals as described above may be beneficial.

Figure 9:
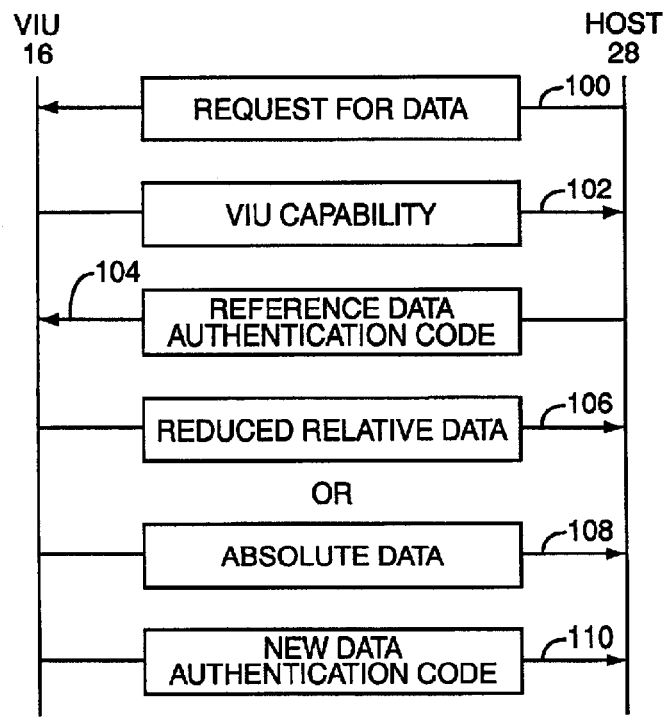
FIG. 9 illustrates one preferred form of communication protocol.

FIG. 9 illustrates a data communication protocol diagram, which shows a preferred form of data communication transmissions between the VIU 16 and the host computer 28. Data transmissions consist of several identifiable message elements. In one preferred form of the invention, the message elements are sent individually and distinctly as separate data packets. In another preferred form, the message elements are combined with other proprietary message elements into the data packets in order to further save communications overhead. These are functionally identical for the purposes of the invention. The following discussion refers to logical data messages, not necessarily to individual data packets.

At some time after establishment of a connection between the VIU 16 and the host computer 28 for the purposes of transferring data, the host computer 28 will make a request message (step 100) to the VIU 16 for the vending data to be sent to the host computer 28. A VIU 16 equipped with relative data reduction capability may send a reply (step 102) to the host computer 28 identifying its ability to send reduced data. If the VIU 16 indicated the ability to perform data reduction, the host computer 28 then sends a data authentication code to the VIU 16 (step 104) representing the reference data file held in the host computer 28. The VIU 16 compares this to the authentication code for the reference data it holds from the previous successful transmission of data. If the authentication codes match, the VIU 16 sends the new data file (step 106) in reduced relative form together with an authentication code (step 110) representing the new data file, and the host computer 28 reconstructs a replica absolute file from the reference data file and the relative data file. The host computer 28 calculates an authentication code from the reconstructed data file, and if it matches the one sent by the VIU 16, the integrity of the reconstructed file is confirmed.

If the VIU 16 does not have the capability to perform the data reduction, or the authentication code (step 104) does not match the one for the VIU reference data, the two files are considered different (non-synchronized) and the VIU 16 will send the absolute data file in place of the relative data file (step 108), followed by an authentication code (step 110). This reconstructed or absolute file at the host computer 28 is passed on to the central server computer 30, and is also stored in the host computer 28 as the new reference file for the next data transfer. If the reconstructed data file is not authenticated, the host computer 28 re-requests the data in absolute format.

Figure 10:
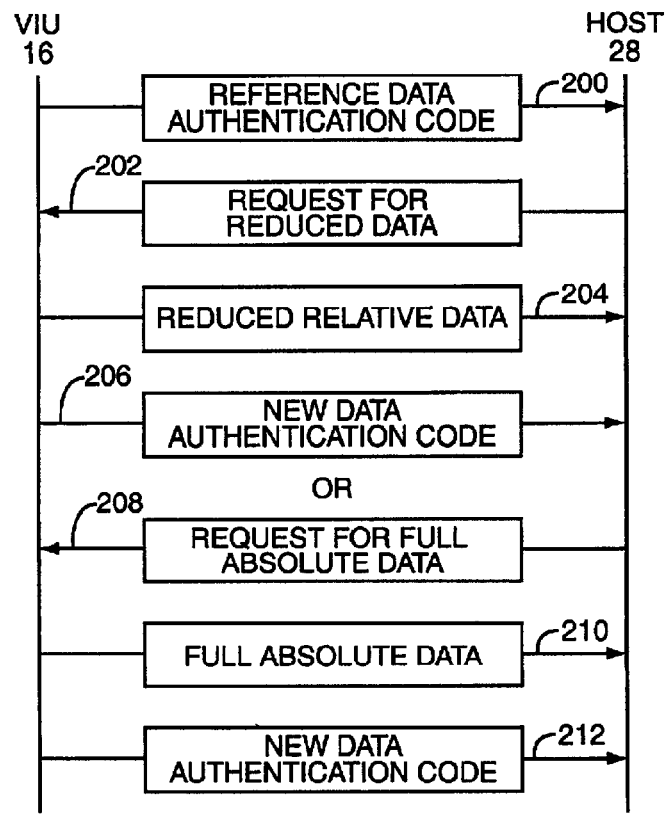
FIG. 10 illustrates another preferred form of communication protocol.

With reference to FIG. 10, in another form the VIU 16 first sends the authentication code (step 200) for its reference data to the host computer 28. The host computer 28 then compares this to the authentication code for its own reference data, and requests data from the VIU in one of two forms. If the authentication codes match, the host computer 28 sends a request message (step 202) for relative data, and receives relative data (step 204) plus the new authentication code (step 206) from the VIU 16. If the original authentication code (step 200) does not match, the host computer 28 instead sends a request message (step 208) for absolute data, which is returned (step 210) by the VIU 16 together with the new authentication code (step 212). If the new authentication codes (steps 206 or 212) do not match the reconstructed data, the host computer 28 will re-request and re-receive the data in absolute format (steps 208, 210, and 212).

In yet another form, new authentication codes are not sent, but are recalculated at the host computer 28 from the reconstructed data file. In this form, the codes cannot be used for transmission error checking, and normal error checking on the data packets is relied on to ensure data integrity. It is preferred that the communications between the VIU 16 and host computer 28 be two-way so that if there is a mismatch, the data can be re-requested by the host computer 28 as described above. Since bi-directional communications media are not always available, convenient, or cost-effective, the invention is effective using unidirectional communications. If unidirectional data transmission is used, from time to time a transmission of the absolute data is preferably in order to ensure synchronization between the two ends as described in more detail above. The use of available high reliability communications will ensure low error rates so that periods of non-synchronization between the VIU 16 and the host computer 28 are kept acceptably low.

The data processing described herein is particularly applicable to the data available from vending machines, and takes advantage of the typically consistent format of data obtained from vending machines. That is to say that the differences between data obtained from the vending machine on two successive days is typically small, and the data records are typically presented in a consistent sequence.

In one preferred form, data reduction at the VIU 16 includes tokenisation of common data elements, reduction by calculating relative differences, and compression using Huffman-style encoding. The data is optionally protected during transmission by multiple layers of packeting and checksums. At the host computer 28, the order is reversed by expanding the compressed data, reconstructing the data file (which contains tokens), and finally, passing the data on to the central server computer 30, where the tokens are replaced with the original plain data that they represent. In this manner, the overall process has been found in practice to reduce the transmitted data in some cases to less than two percent of the original data size with no loss of data on an end-to-end basis. In other preferred forms, the order of and optional inclusion or omission of data tokenization and compression may be varied.

The reduction technique is equally applicable to all formats of vending machine data obtained by any protocol from the VMC 12 or other source. Common protocols in use for communicating with VMCs 12 in order to obtain the vending data, also referred to as the Vending Interface Data Transfer Standard (VIDTS) data, include DEX/UCS, MBD, and DDCMP. These are industry standard protocols, whose definitions are readily available to those skilled in the art, and therefore are not replicated herein. For the purposes of description, assume that the vending machine related data takes on a DEX data format. This is a generic reference to the data according to one preferred form of implementation, and is not a reference to any necessary manner of connection or protocol by which the vending data may be obtained from the vending machine 10.

It is assumed that, by transfer of an absolute file or by other means at some time, identical reference files exist at the VIU 16 and in the central server computer 30. It can be seen that the relative difference algorithm is therefore applied to second and subsequent file transfers. The operation of the relative difference reduction algorithm and the reconstruction algorithm as implemented by a CPU 34 within the VIU 16 will now be described in detail in one of its preferred forms.

Figure 11A:
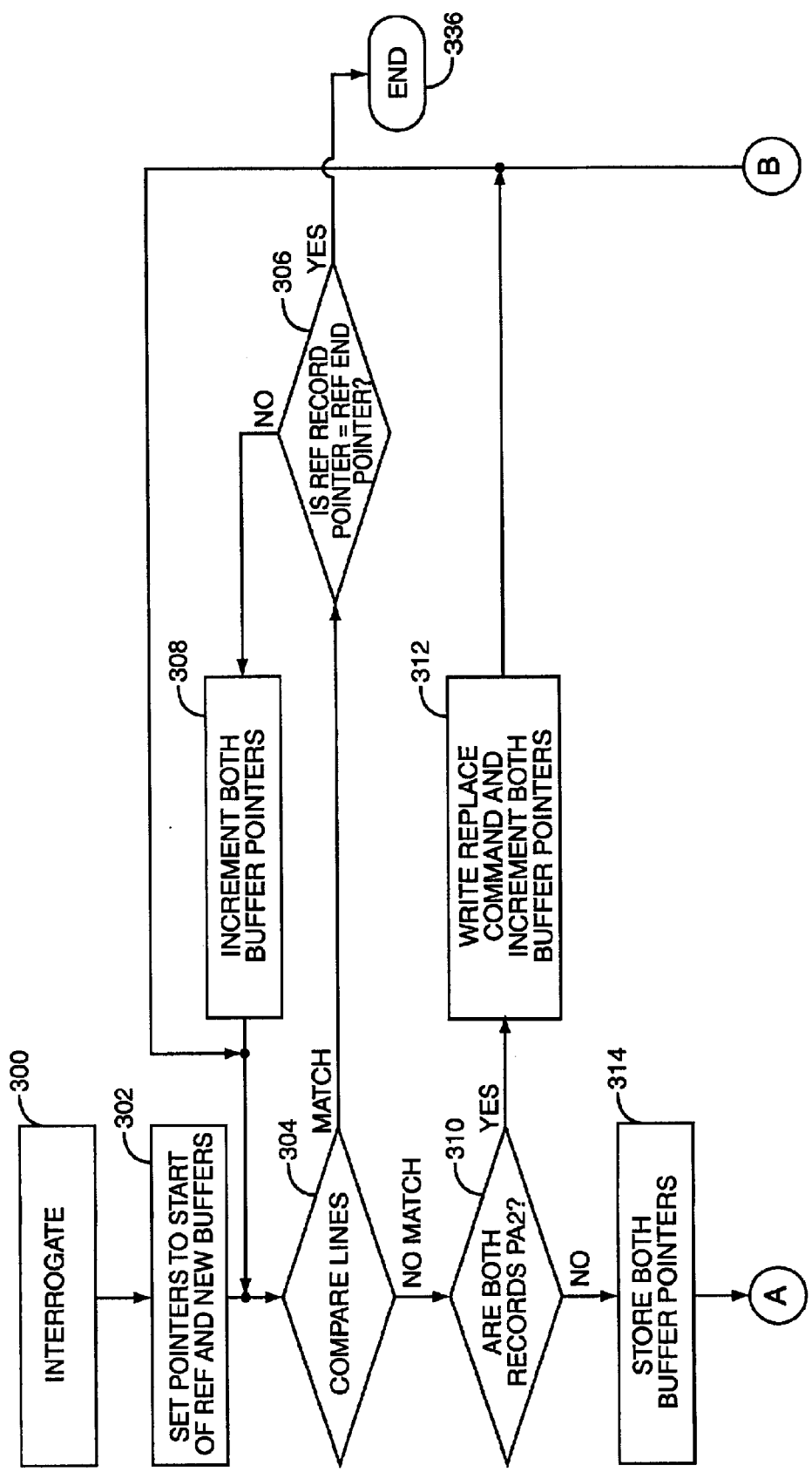
FIG. 11 illustrates the preferred flow for generating a reduced file according to a preferred embodiment of the present invention.
Figure 11B:
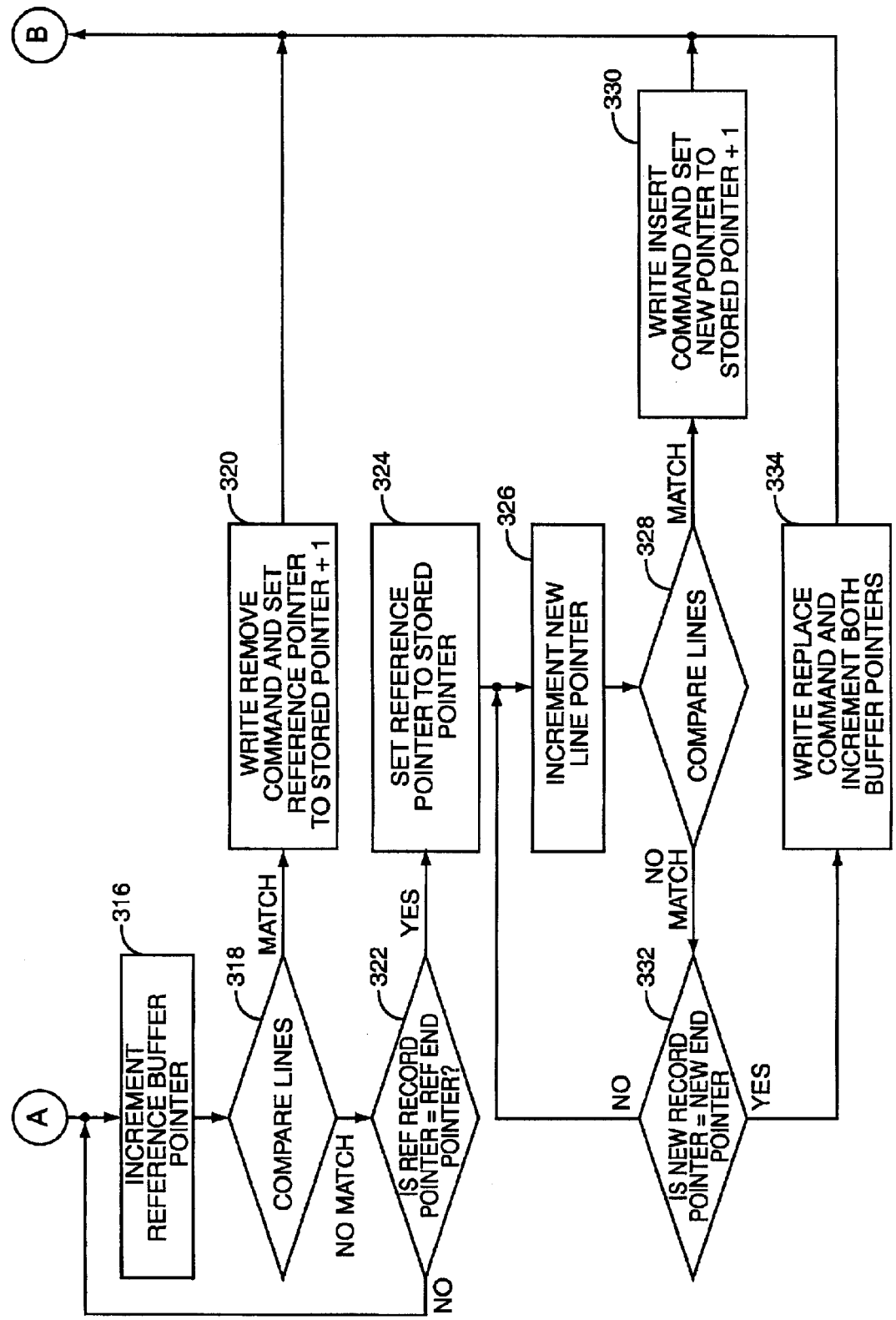

FIG. 11 is a flow chart describing one preferred form of creating a relative difference file for vending machine data. The difference file is produced in the VIU 16, which is located within the vending machine 10 or in another convenient place. Preferably, the difference file consists of explicit records for each of one of three types of data. Each record type can represent insertions where data is present in the new file and not the reference file, deletions where the data in the reference file is no longer represented in the new file, or replacements where the line exists in the correct place in both files but there are changes within that line of data. A fourth record type could be created to indicate that the lines match in all detail, but the preferred embodiment treats matching records implicitly and suppresses transmission of information representing matches. Because it has been found that the differences between successive data files are relatively small, only the differences are communicated. Each difference record preferably consists of a record type, a reference file line number to which it refers, and (where applicable) the replacement or insertion data. In this implementation of the algorithm, the action and the line number are cobined mathematically to form a single field. After successfully sending the relative difference file, the new data file is made the reference file for subsequent transfers.

For the present example, assume that Coca Cola's vending machine standards are in place and DEX data standards are used. A DEX data file contains many lines corresponding to records of information about the vending machine 10, including sales data. For clarification, a typical DEX is listed in the table below.

TABLE 1

Sample DEX Data

| Line Number | Sample DEX Records |
|---|---|
| 1 | DXS*9259630007*VA*V1/1*1** |
| 2 | ST*001*0001 |
| 3 | ID1*0896330419*GIII_VENDOR 67084-7*8*NONE**JLS_TEST |
| 4 | ID4*2*1* |
| 5 | VA1*309960*3903*309960*3903 |
| 6 | VA2*0*21*0*21 |
| 7 | CA1***** |
| 8 | BA1*CAI000449916410*BA30B!!!!!-1*1** |
| 9 | DA1*DEB          *          *1001** |
| 10 | CA3*339965*88340*40025*2116*339965*88340*40025*2116 |
| 11 | CA4*62205*325*62205*325 |
| 12 | CA9*40100*40100 |
| 13 | LS*0100 |
| 14 | CA17*0*5*66*0*7 |
| 15 | CA17*1*10*1*0*4 |
| 16 | CA17*2*25*81*0*10 |
| 17 | LE*0100 |
| 18 | DA2*34200*456*34200*456 |
| 19 | TA2*0*0*0*0 |

TABLE 1-continued

Sample DEX Data

| Line Number | Sample DEX Records |
|---|---|
| 20 | LS*0200 |
| 21 | PA1*1*80*NONE |
| 22 | PA2*943*74945*943*74945 |
| 23 | PA5***141 |
| 24 | PA1*2*80*NONE |
| 25 | PA2*330*26200*330*26200 |
| 26 | PA5***142 |
| 27 | PA1*3*80*NONE |
| 28 | PA2*88*6985*88*6985 |
| 29 | PA5***143 |
| 30 | PA1*4*80*NONE |
| 31 | PA2*633*50265*633*50265 |
| 32 | PA5***144 |
| 33 | PA1*5*80*NONE |
| 34 | PA2*674*53475*674*53475 |
| 35 | PA5***145 |
| 36 | PA1*6*80*NONE |
| 37 | PA2*126*9985*126*9985 |
| 38 | PA5***146 |
| 39 | PA1*7*80*NONE |
| 40 | PA2*295*23445*295*23445 |
| 41 | PA5***147 |
| 42 | PA1*8*80*NONE |
| 43 | PA2*331*26280*331*26280 |
| 44 | PA5***148 |
| 45 | PA1*9*80*NONE |
| 46 | PA2*253*20060*253*20060 |
| 47 | PA5***149 |
| 48 | PA1*10*80*NONE |
| 49 | PA2*0*0*0*0 |
| 50 | PA1*11*80*NONE |
| 51 | PA2*0*0*0*0 |
| 52 | PA1*12*80*NONE |
| 53 | PA2*0*0*0*0 |
| 54 | LE*0200 |
| 55 | EA2*CR**0 |
| 56 | EA2*DO*53 |
| 57 | EA3*118 |
| 58 | EA7*8*8 |
| 59 | MA5*BAUD*9600 |
| 60 | MA5*SWITCH*UNLOCK*1,6**8,10 |
| 61 | MA5*TUBE1*2*66*1*81 |
| 62 | MA5*TUBE2* |
| 63 | MA5*SEL1*1,3,7*882*1014 |
| 64 | MA5*SEL2*1,3,7*115*129 |
| 65 | MA5*SEL3*1,3,7*62*75 |
| 66 | MA5*SEL4*5,11*611*712 |
| 67 | MA5*SEL5*2,8*626*810 |
| 68 | MA5*SEL6*9*283*365 |
| 69 | MA5*SEL7*12*251*351 |
| 70 | MA5*SEL8*4,10*477*505 |
| 71 | MA5*SEL9*6*222*299 |
| 72 | MA5*SEL10**0*0 |
| 73 | MA5*SEL11**0*0 |
| 74 | MA5*SEL12**0*0 |
| 75 | SD1*000000000000 |
| 76 | G85*5010 |
| 77 | SE*68*0001 |
| 78 | DXE*1*1 |

Each line is prefixed with a record identifier to identify different types of information. Asterisks separate the "fields" of information. DXS* denotes the start of DEX and established communications DEX revisions, ST* is the start of the section, ID1* contains machine identification, and so on. These are all defined in Coca-Cola's Electronic Vending Standards in PART III, MIS DATA COMMUNICATION.

For DEX, sales information is communicated in three record types: PA1, PA2, and PA5. Sales are reported against sales for each selection. Therefore, the PA1, PA2, and PA5 records are repeated for each selection. With reference to the sample DEX file above, the LS*200 record on line 20 identifies the loop start for the sales section. Line 21 includes the record "PA1*1*80*NONE," which identifies selection button 1, the vend price of 80 cents, and that there is no product name entered into the memory of the vending machine for that product. The vending name may be a product name, such as Coca-Cola Classic. Line 22 includes the record "PA2*943*74945*943*74945," which indicates that there have been 943 sales amounting to 74945 cents since initialization (factory new) and 943 sales amounting to 74945 cents since the internal counters of the vending machine 10 were reset. In the present example, the counter has not been reset since factory new, because these two sales figures are identical. Line 23 includes the record "PA5***141," which indicates that there have been 141 attempts to buy product while sold out from selection button 1 since new. Line 24 includes the record "PA1*2*80*none," which is similar to the record at line 21, but is for selection 2. Lines 25 and 26 are analogous to lines 22,23 except they represent data for selection 2.

With reference to FIG. 11, one preferred technique is shown for generating a file highlighting data differences incorporating a relative differencing reduction algorithm or process. The process starts by the VIU 16 performing an interrogation of the VMC 12 within the vending machine 10 in order to extract DEX data, or any desired type data, from the VMC 12 (step 300). Upon successful retrieval of the data, a series of pointers are initialized to point to the first records of both the new and reference data (step 302). Again, the reference data represents the former state of the vending machine 10 at the last update. The new data represents the current state of the vending machine 10.

Next, the process compares the records pointed to by the pointers (step 304). If they match, and the reference pointer has not reached the end of the data (step 306) then both pointers are incremented to point to the next records in their respective data (step 308). The process then returns to the main loop wherein the records pointed to by the pointers are compared (step 304).

In the interests of efficiency, the differencing algorithm has been simplified to reduce the code space required to implement it, and could thus be seen to introduce potential inefficiencies, particularly if the data files contain one or more identical lines. To overcome one of these potential inefficiencies, the replace command is used for certain kinds of data, such as DEX PA2 records, in which duplicate lines are known to be common. In other forms, additional difference file record types could be included. An example of these is a move record type, used where the line order of the two files is different. This eliminates successive deletions and insertions to achieve the same result. Another is a duplicate command type, which is used to eliminate the resending of data identical to some just sent.

In a DEX implementation, "PA5" type records are normally only present if a product is sold out or the vending machine is unable to vend the product for some reason. Since PA2 records in new vending machines 10 are often very similar or identical for corresponding selections, the preferred embodiment of the present invention provides preliminary processing for PA2 records or other records that may appear to be identical to other records in the data file. The reason for providing special attention to records that may appear identical to other records will become further apparent as the flow for FIG. 11 is described.

If the records do not match and they are both PA2 records (step 310), then a replace command is written, both pointers are incremented (step 312) and the process returns to step 304. The replace command essentially provides instructions for the host computer 28 to update the data associated with the corresponding record. Additional detail is provided below.

If the records do not match and they are not PA2 (or like records capable of appearing identical to another record), the new and reference pointers are stored (step 314) and the reference pointer is incremented (step 316). Another comparison with the records identified by the pointers is made (step 318). If the records match at this point, a remove command is written and the reference pointer is returned to its stored value and incremented (step 320). The remove command will provide instructions to remove the record prior to the match. If the records do not match (step 318), and the pointer has not reached the end of the data (step 322), then the process returns to step 316.

For example, if there are ten records in a row that need to be removed, the process scans down through all ten records, and generates one remove command for the first record when it finds the first match after the tenth record. The process will then track from step 304 to step 316 and scan down through the nine remaining records that need to be removed and will generate one more remove command for the second record. The process repeats to generate remove commands for the third, fourth, fifth, sixth, seventh, eighth, ninth and tenth record in the section of records to delete. Thus, ten remove commands are generated, one for each of the consecutive records. The process then returns to step 304. Although alternative arrangements can be used to generate remove commands, this preferred process eliminates the need for counting records to remove, and significantly simplifies the software requirements and reduces the amount of memory resources necessary to implement the invention.

If the pointer has reached the end of the data (step 322), the reference pointer is returned to the stored value (step 324) and the new pointer is incremented (step 326). The corresponding new and reference records are then compared (step 328), and if they match, an insert command is written and the new pointer is returned to its stored value and incremented (step 330). The insert command preferably provides instructions to insert the new record and associated data in the proper position. The process is then returned to step 304.

If the records do not match (step 328) and the pointer has not reached the end of the data (step 332), then the process returns to (step 326). If the pointer has reached the end of the data (step 332), then a replace command corresponding to the new record is written and the new pointer is returned to the stored value, and both the new pointer and the reference pointers are incremented (step 334). The process is then returned to step 304. The process is stopped (step 336) when the test at steps 304 and 306 become true, which occurs when the new pointer and the reference pointers reaches the end of the data because of the matched condition (step 304).

Table 2 below is an example of the differentially reduced relative data produced by the VIU 16 employing one preferred form of this invention. The example shows the difference file without compression and without tokenization, for the sake of readability. The tokenization can be performed either before or after differencing. In one preferred form of the invention, the data is tokenized before differential reduction to simplify the implementation.

TABLE 2

Sample Reduced Data

| Reduced Data Record | Explanation |
| --- | --- |
| 0001 DXS*9264230000*VA*V1/1*1154 | This record represents a replacement of line 1 |
| 6025 | This record represents a deletion of line 25 |
| 3027 MA5*TUBE1*0,2*76*8*21*0 | This record represents an insert at line 27 |
| 0238 G85*A8BA | This record represents a replace of line 238 |

The difference data file consists of records of data (one record for each line of the file) each containing two fields:

Action/Line number field—This is a four digit numeric value containing a line number and an action to perform on the data with that line number DEX record field—The actual or tokenised record that the Action/Line number refers to, which was obtained from the vending machine.

As noted, there are preferably three types of actions:

1. Replace—This means replace a record of the reference file at the line number specified with a new one. A typical example of this would be a PA2 sales data record.
2. Insert—This means insert a record at the line number specified.
3. Delete—This means remove a line (skip) of the reference file.

This command does not contain any record data.

The method used in this preferred form for the action/line number combines the line number and action type into a single number, which has been designed to compress well. The three number ranges representing the three types of action are:

0-2999 for Insert
3000-5999 for Replace
6000-8999 for Delete

The following algorithm is used to produce the action/line number:

If the action is insert then
   action/line number=line number
Else if the action is replace then
   action/line number=line number+3000
Else if the action is delete then
   action/line number=line number+6000
End if In order to extract the action and line in the reconstruction of the data file the following algorithm is performed:

If action/line number>0 and<3000 then
   action=insert
   line number=action/line number
Else if action/line number>3000 and<6000 then
   action=replace
   line number=action/line number−3000
Else if action/line number>6000 and<9000 then
   action=delete
   line number=action/line number−6000
End if The examples and algorithms above outline one preferred method of combining and extracting actions and line numbers where data file sizes are limited to 3000 lines or records. Other methods of combining actions and line numbers or otherwise reducing the data represented by these two items are envisaged as equally useful.

Figure 12A:
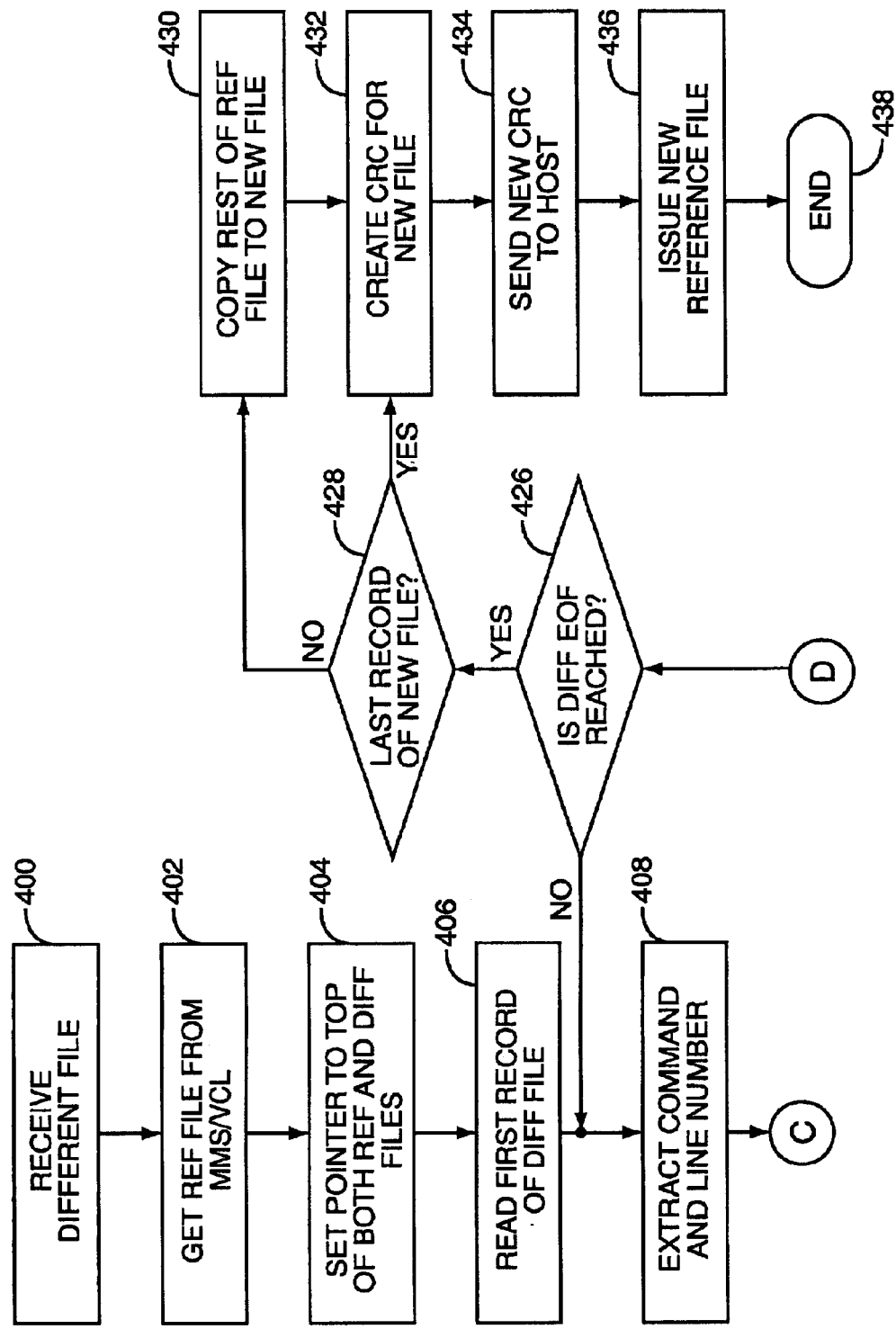
FIG. 12 illustrates the preferred flow for reconstructing the reduced file to update vending information according to a preferred embodiment of the present invention.
Figure 12B:
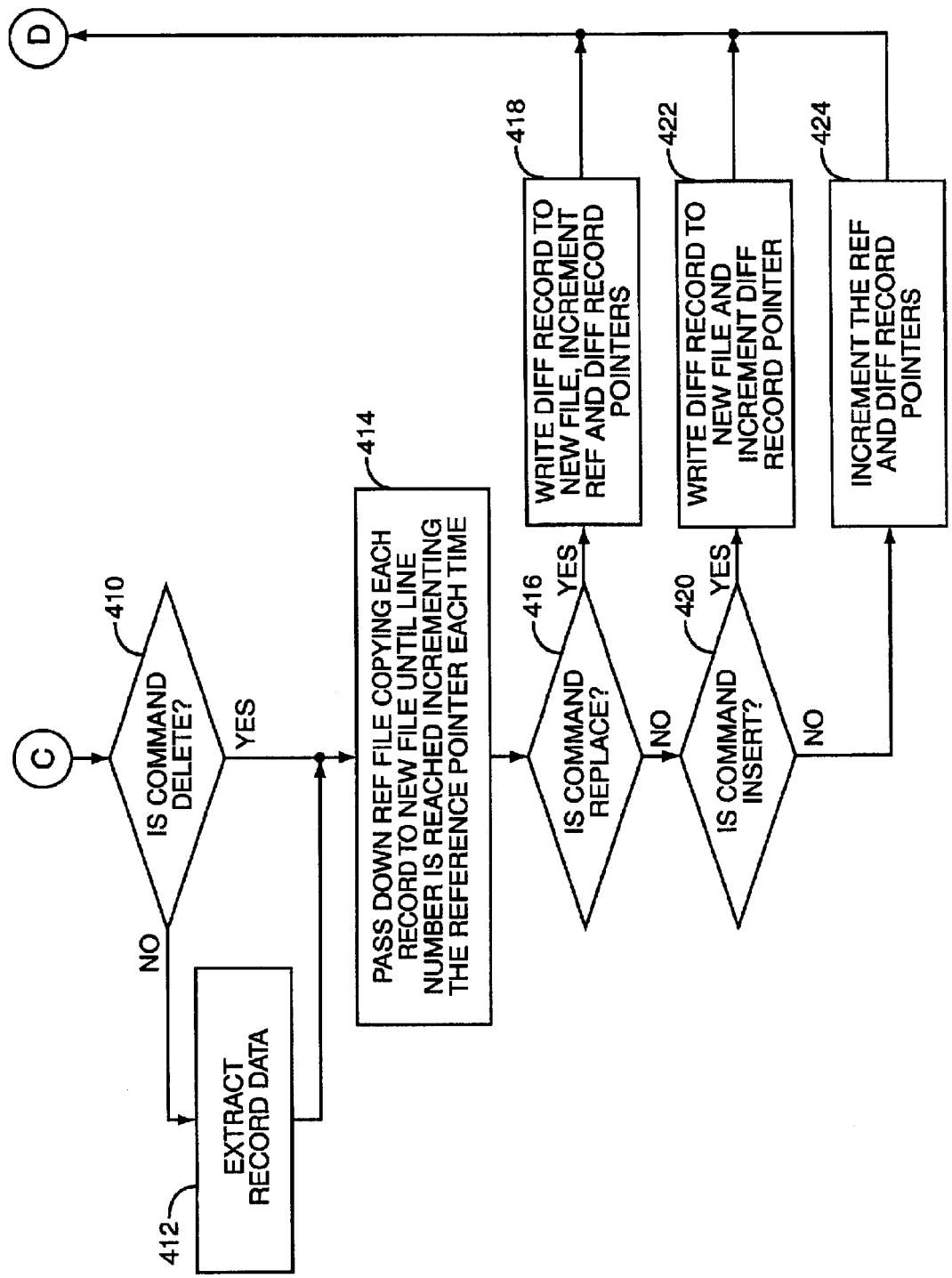

FIG. 12 is a flow chart describing one preferred form of the reconstruction process for the file at the host computer 28. The resulting file is both passed to the operational database for use in the vending machine management process, and also kept in tokenised form as the new reference file for subsequent transfers, thus matching the reference file remaining in the VIU 16.

In order to reconstruct (build) the new DEX file from the reference DEX and differential DEX files, a software program is used. This DEX build program is required to accept the differential file, retrieve a reference DEX file, and once the new DEX file has been built, to issue it to the data management system as the latest DEX data for that VIU 16. The DEX build program will also calculate the reference authentication code from the latest DEX file and send it to a database for use in the next call from that VIU 16. In one preferred form of the invention, the authentication code used is a cyclic redundancy checksum (CRC), the method of which is described in the International Telecommunication Union (ITU) Telephone and Telegraph Consultative Committee (CCITT) standards publication reference v.41.

With detailed reference to FIG. 12, in one form, the reconstruction or file building process is started when a differential file is received (step 400). The reference file is retrieved (step 402), and a series of pointers to the first records of the differential and reference files are initialised (step 404). The first record of the differential data is read (step 406) and the command and line number are extracted from that record (step 408). The command is checked to establish if it is a delete command (step 410). If the command is not a delete command, the differential record data is extracted (step 412). Otherwise step 412 is bypassed, as no data will be present.

Next, the process steps through each of the reference records, copying them to the new data file and incrementing a counter each time, until that counter reaches the same value as the extracted line number (step 414). If the command is a replace command (step 416), the differential record data is written to the new data file and the reference and differential record pointers are incremented (step 418). If the command is an insert command (step 420), the differential record data is written to the new data file and the differential record pointer is incremented (step 422). Otherwise, indicating a delete command, the reference record pointer and the difference record pointers are incremented to point to the next record (step 424). After any one of steps 418, 422, or 424, the process checks if the differential record pointer has reached the end of the data (step 426). If the end of the data has not been reached, the process returns to step 408 to extract the next command and line number.

If the difference data pointer has reached the end of the data (step 426), the process will determine if the last record of the new file is a DXE record, which indicates the end of data (step 428). If the end of the data in the new file has not been reached, the reference records from the current pointer to the end of the reference data are copied to the new file (step 430). After copying the records to the new file (step 430) or otherwise determining the last record has been reached (step 428), a CRC value of the new file is created (step 432) and sent to the host computer 28 (step 434). At this point, a new reference file is issued (step 436), which will function as the reference file for subsequent processes, and the process ends (step 438).

Those skilled in the art will recognize modifications and improvements to the concepts described herein. These modifications and improvements are considered within the scope of the disclosure and the claims that follow. Please note that references to actual DEX symbols, as opposed to token symbols, are as examples to enhance readability and understanding of the invention. The invention is not limited to the example data shown. In another preferred form, the data reduction comparisons are performed on a character-by-character basis rather than on a line-by-line basis. In another, the comparisons are performed field by field. These are not significant differences in method. In essence they represent a change in the size of objects compared.

What is claimed is:

1. A vending machine, comprising:
    a) a control system adapted to:
        i) determine new vending data for the vending machine, the new vending data relative to reference vending data kept at a central processing system for the vending machine; and
        ii) generate difference indicia capable of instructing the central processing system to modify the reference vending data to reflect the new vending data;
    b) communication electronics associated with said control system and adapted to communicate the difference indicia to the central processing system wherein the reference data at the central processing system is modified using the difference indicia to reflect the new vending data;
    wherein the reference vending data and the new vending data include records and data for the records end said control system is further adapted to compare the corresponding records for the reference vending data and the new vending data to identify records to insert into and records to delete from the reference vending data to reflect the new vending data.

2. The vending machine of claim 1, wherein said control system is further adapted to compare the corresponding records for the reference vending data and the new vending data to identify records to modify in the reference vending data to reflect the new vending data.

3. The vending machine of claim 1, wherein said control system is adapted to generate the difference indicia to include a line number for an affected record, a type for the affected record, and data, if necessary, for the affected record.

4. A vending machine, comprising:
    a) a control system adapted to:
        i) determine new vending data for the vending machine, the new vending data relative to reference vending data kept at a central processing system for the vending machine; and
        ii) generate difference indicia capable of instructing the central processing system to modify the reference vending data to reflect the new vending data; and
    b) communication electronics associated with said control system and adapted to communicate the difference indicia to the central processing system wherein the reference data at the central processing system is modified using the difference indicia to reflect the new vending data;
    wherein said control system is further adapted to tokenize portions of data in the difference indicia such that the central processing system recovers data from the portions of data tokenized by the control system.

5. A computer readable medium comprising software for instructing a control system to:
   a) determine new vending data for a vending machine, the new vending data relative to reference vending data kept at a central processing system for the vending machine;
   b) generate difference indicia capable of instructing the central processing system to modify the reference vending data to reflect the new vending data; and
   c) effect communications of the difference indicia to the central processing system wherein the reference data at the central processing system is modified using the difference indicia to reflect the new vending data;
   wherein to reference vending data and the new vending data include records and data for the records and further comprising instructions to compare the corresponding records for the reference vending data and the new vending data to identify records to insert into and records to delete from the reference vending data to reflect the view vending data.

6. The computer readable medium of claim 5, further comprising instructions to compare the corresponding records for the reference vending data and the new vending data to identify records to modify in the reference vending data to reflect the new vending data.

7. The computer readable medium of claim 5, further comprising instructions to generate the difference indicia to include a line number for an affected record, a type for the affected record, and data, if necessary, for the affected record.

8. The computer readable medium of claim 5, further comprising instructions to tokenize portions of data in the difference indicia such that the central processing system recovers data from the portions of data tokenized by the control system.

9. A method comprising:
   a) determining new vending data for a vending machine, the new vending data relative to reference vending data kept at a central processing system for the vending
   b) generating difference indicia capable of instructing the central processing system to modify the reference vending data to reflect the new vending data; and
   c) communicating the difference indicia to the central processing system wherein the reference data at the central process system is modified to reflect the new vending data using the difference indicia;
   wherein the reference vending data and the new vending data include records and data for the records and further comprising comparing the corresponding records for the reference vending data and the new vending data to identify records to insert into and records to delete from the reference vending data to reflect the new vending data.

10. The method of claim 9, further comprising comparing the corresponding records for the reference vending data and the new vending data to identify records to modify in the reference vending data to reflect the new vending data.

11. The method of claim 9, further comprising generating the difference indicia to include a line number for an affected record, a type for the affected record, and data, if necessary, for the affected record.

12. The method of claim 9, further comprising tokenizing portions of data in the difference indicia such that the central processing system recovers data from the portions of data tokenized by the control system.

* * * * *